United States Patent
Kicherer et al.

(10) Patent No.: US 10,536,432 B2
(45) Date of Patent: Jan. 14, 2020

(54) METHOD FOR DETERMINING AN ADDRESS OF A COMPONENT OF A VEHICLE

(75) Inventors: Max Kicherer, Munich (DE); Torsten Schlichter, Leipzig (DE); Lars Voelker, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 945 days.

(21) Appl. No.: 13/221,215

(22) Filed: Aug. 30, 2011

(65) Prior Publication Data
US 2012/0054340 A1 Mar. 1, 2012

(30) Foreign Application Priority Data
Aug. 31, 2010 (DE) .................. 10 2010 040 020

(51) Int. Cl.
*G06F 13/00* (2006.01)
*H04L 29/12* (2006.01)

(52) U.S. Cl.
CPC ............................ *H04L 61/6004* (2013.01)

(58) Field of Classification Search
CPC . H04L 61/2038; H04L 61/6004; H04L 67/12; H04L 61/6059; H04W 4/046; G06C 5/0808; G06C 5/008
USPC .................... 709/245, 227–229, 223, 224
See application file for complete search history.

(56) References Cited

U.S. PATENT DOCUMENTS

| | | | | |
|---|---|---|---|---|
| 5,521,815 A | * | 5/1996 | Rose, Jr. | G06Q 10/087 705/28 |
| 6,076,064 A | * | 6/2000 | Rose, Jr. | G06Q 10/06 705/28 |
| 7,714,705 B2 | * | 5/2010 | Rennie | G08G 1/017 340/426.16 |
| 7,917,603 B2 | * | 3/2011 | Kim | H04L 29/1232 709/220 |
| 8,005,052 B2 | * | 8/2011 | Hayashi | H04W 72/04 370/337 |
| 8,120,473 B2 | * | 2/2012 | Rennie | G08G 1/017 340/426.16 |
| 8,538,408 B2 | * | 9/2013 | Howarter | B60R 25/2009 455/420 |

(Continued)

FOREIGN PATENT DOCUMENTS

| | | |
|---|---|---|
| DE | 198 50 454 A1 | 5/2000 |
| DE | 100 26 754 A1 | 12/2001 |

(Continued)

OTHER PUBLICATIONS

Translated WO 2009/092973 A2 (Year: 2009).*

(Continued)

*Primary Examiner* — Kenneth R Coulter
(74) *Attorney, Agent, or Firm* — Crowell & Moring LLP

(57) ABSTRACT

A method is provided for determining an address of a component of a vehicle, wherein a vehicle identification is determined and stored in a first field of the address, and wherein an identification of the component is stored in a second field of the address. Furthermore, a method for accessing a component of a vehicle, in particular, a control unit of the vehicle, by use of the determined address of the component is provided, as well as a vehicle with at least one such component is also proposed.

14 Claims, 2 Drawing Sheets

(56) References Cited

U.S. PATENT DOCUMENTS

| | | | | |
|---|---|---|---|---|
| 8,588,197 | B2* | 11/2013 | Suzuki | H04W 72/10 370/341 |
| 8,687,612 | B2* | 4/2014 | Menaceur | H04L 29/12452 370/328 |
| 8,855,009 | B2* | 10/2014 | Niiyama | G07C 5/008 370/254 |
| 2003/0055812 | A1* | 3/2003 | Williams | G06F 16/904 |
| 2005/0273505 | A1* | 12/2005 | Kim | H04L 29/1232 709/220 |
| 2007/0038337 | A1* | 2/2007 | Hofmann et al. | 701/1 |
| 2007/0061362 | A1* | 3/2007 | Rodriguez | B05D 5/061 |
| 2008/0222005 | A1* | 9/2008 | Schickler | G06Q 10/087 705/26.8 |
| 2009/0154379 | A1* | 6/2009 | Hayashi | H04W 72/04 370/280 |
| 2009/0161644 | A1* | 6/2009 | Suzuki | H04W 72/10 370/341 |
| 2009/0248236 | A1* | 10/2009 | Schwinke | 701/33 |
| 2010/0182163 | A1* | 7/2010 | Rennie | G08G 1/017 340/905 |
| 2010/0302974 | A1* | 12/2010 | Niiyama et al. | 370/254 |
| 2010/0303048 | A1 | 12/2010 | Staehlin et al. | |
| 2011/0194541 | A1* | 8/2011 | Menaceur | H04L 29/12452 370/338 |
| 2012/0208520 | A1* | 8/2012 | Howarter | B60R 25/2009 455/420 |
| 2015/0215274 | A1* | 7/2015 | Imadali | H04L 61/6059 709/245 |

FOREIGN PATENT DOCUMENTS

| | | | |
|---|---|---|---|
| DE | 10 2005 009 639 A1 | 9/2006 | |
| DE | 10 2005 036 959 A1 | 2/2007 | |
| DE | 10 2005 038 183 A1 | 2/2007 | |
| DE | 10 2006 053 559 A1 | 5/2008 | |
| DE | 10 2008 060 231 A1 | 6/2009 | |
| DE | 10 2008 036 172 A1 | 2/2010 | |
| WO | WO-2009092973 A2 * | 7/2009 | H04L 29/12452 |

OTHER PUBLICATIONS

Lear, IETF RFC 4291 "Internet Engineering Task Force", Multi6 Solution Questionnaire Oct. 2005, pp. 1-11.

Crawford, IETR RFC 2462, "Transmission of IPv6 Packets Over Ethernet Networks", Dec. 1998, pp. 1-7.

Blanchet, IETF RFC 5156, Special-Use IPv6 Addresses:, Apr. 2008, pp. 1-7.

Devarapalli, et al., IETF RFC 3963, "Network Mobility (NEMO) Basic Support Protocol", Jan. 2005, pp. 1-33.

Narten, et al., IETF RFC 4861, "Neighbor Discovery for IP version 6 (IPv6)", Sep. 2007 pp. 1-97.

German Search Report dated Aug. 31, 2011 with partial English translation (ten (10) pages).

* cited by examiner

METHOD FOR DETERMINING AN ADDRESS OF A COMPONENT OF A VEHICLE

CROSS-REFERENCE TO RELATED APPLICATION

This application claims priority under 35 U.S.C. § 119 from German Patent Application No. DE 10 2010 040 020.3, filed Aug. 31, 2010, the entire disclosure of which is herein expressly incorporated by reference.

BACKGROUND AND SUMMARY OF THE INVENTION

The invention relates to a method for determining an address of a component of a vehicle, a method for accessing a component of a vehicle and a vehicle with such a component.

The Internet protocol version 6 (IPv6) (also known under its former name "Internet protocol next generation," IPnG) is the successor of the Internet protocol version 4. IPv6 specifies the procedures that are necessary for exchanging data by means of a packet switched data network, such as the addressing of the network elements that are involved (computer or router), and the procedure of the packet forwarding between subnets (routing). As such, IPv6 is a standard for the data linked layer (layer 3) of the OSI [Open Systems Interconnection] model.

An IPv6 addressing architecture is described in the document IETF RFC 4291 [Internet Engineering Task Force]. The document IETF RFC 2464 relates to the transmission of IPv6 packets over Ethernet networks and describes the composition of a so-called host portion of an IPv6 address based on an Ethernet Mac address (EUI 64 format [Extended Unique Identifier]). Furthermore, the document IETF RFC 5156 relates to the specific use of IPv6 addresses and describes the generation of an IPv6 address based on an already existing IPv4 address. The document IETF RFC 3963 describes the possibility of reaching an IPv6 network, which is defined by the network portion of the IPv6 address, by means of an IPv6 address that is located in different network. Furthermore, the document IETF RFC 4861 describes a so-called "router advertisement," which disseminates network information to hosts. The International Standards Organization (ISO) specifies under the title "ISO 13400" a standard for diagnostic communication with vehicles ("Diagnostics over IP," DoIP). In addition, the ISO has specified under the title ISO 3779 a standard for assigning globally unique vehicle identifications (VIN=Vehicle Identification Number).

The drawback with the aforementioned technology is that the known approaches do not provide for a uniform addressing of components (for example, control units) of a vehicle that can be used both outside as well as inside the vehicle.

The object of the invention consists of avoiding the aforementioned drawbacks and, in particular, to provide an efficient possibility of uniformly addressing components of a vehicle.

In order to solve the problem, the invention proposes a method for determining an address of a component of a vehicle, wherein a vehicle identification is determined. The vehicle identification is stored in a first field of the address, and an identification of the component is stored in a second field of the address.

The address of the component of the vehicle can be partially or totally determined by automatic means. In particular, the address of the component can be partially or totally determined before or after connecting to a network (for example, of the vehicle). For example, the address of the component can be determined based on the specific vehicle identification and the automatically or manually assignable identification of the component and then secured (that is, in particular, stored in the component).

The component is operated preferably in a network. The network can comprise a network of the vehicle or a bus system of the vehicle.

In this context it is advantageous for the component of the vehicle to be addressable in an unambiguous way by use of the address. Such an addressing can ensue either inside the vehicle or outside the vehicle, if the component or rather the vehicle is connected to a network. Such a connection can exist (for example, temporarily) via a hardwired interface or a radio interface (for example, via a mobile communication network, WLAN, Bluetooth, etc.).

It is a further development that at least one of the following information items is stored additionally in the first field of the address:

(a) a global identification pertaining to the vehicle and/or a manufacturer of the vehicle, (b) a brand of the manufacturer, and (c) a vehicle model.

It is an additional further development that the vehicle identification is an unambiguous identification of the vehicle.

The vehicle identification (VIN=Vehicle Identification Number) can be an alphanumeric character combination that is assigned by the vehicle manufacturer. In particular, the identification can be unique for all vehicles of a manufacturer.

In particular, it is a further development that the first field is a network field of an IPv6 address, and the second field is a host field of an IPv6 address.

In this respect the address for the component of the vehicle is an IPv6 address that allows for a unique identification of the component.

It is also a further development that the vehicle identification is determined using a communication unit that is present in the vehicle.

For example, the vehicle identification can be transmitted over the network of the vehicle by way of a broadcast or multicast message, in order to make it possible to determine and install the address of the component comprising this vehicle identification.

Moreover, it is a further development that the vehicle identification is stored in the component after the component has been connected to a network of the vehicle.

In accordance with an additional further development, the component is a control unit of the vehicle.

A subsequent further development consists of the fact that the identification of the component is associated with a model of the component. In particular, the components of the same model or same configuration can have the same component identification.

If the component in the vehicle is replaced, the address portion relating to the component identification can be retained. The address portion relating to the vehicle (for example, network field of the address) can be updated (automatically or manually) to match.

In one embodiment, the address of the component is an IP address.

Furthermore, the aforementioned problem is solved by a method for accessing a component of a vehicle, in particular, a control unit of the vehicle, by use of an address of the component, wherein the address of the component was determined as described herein (and optionally stored in the component).

An alternative embodiment consists of accessing the component of the vehicle by use of a hardwired or wireless communication connection. The wireless communication connection is, for example, a mobile communication interface, a WLAN interface or a Bluetooth interface. The hardwired communication attachment is, for example, an Ethernet (IEEE 802.3), FireWire (IEEE 1394) or USB interface.

The aforementioned problem is also solved by a vehicle including at least one component that has an address, in particular, an IP address that was determined according to any one of the preceding claims.

Other objects, advantages and novel features of the present invention will become apparent from the following detailed description of one or more preferred embodiments when considered in conjunction with the accompanying drawings.

DETAILED DESCRIPTION OF THE DRAWINGS

The following describes an addressing, an addressing scheme and an addressing architecture, in particular by use of an IPv6 address, such that not only a vehicle, but also a component, for example, a control unit, of the vehicle can be uniquely addressed.

A uniquely addressable component may be any unit that can be connected, or is connected, to a network or bus system of the vehicle. Preferably the component is a control unit of the vehicle with a suitable IPv6 address.

The address is determined in such a way that there will be no conflict with existing (for example, standardized or already assigned) address fields.

In particular, an address is determined by use of the network portion of an address field. In this way, each control unit can be addressed worldwide in a clear and unambiguous manner by means, for example, of mobile IPv6 or NEMO (Network Mobility).

Figure 1:
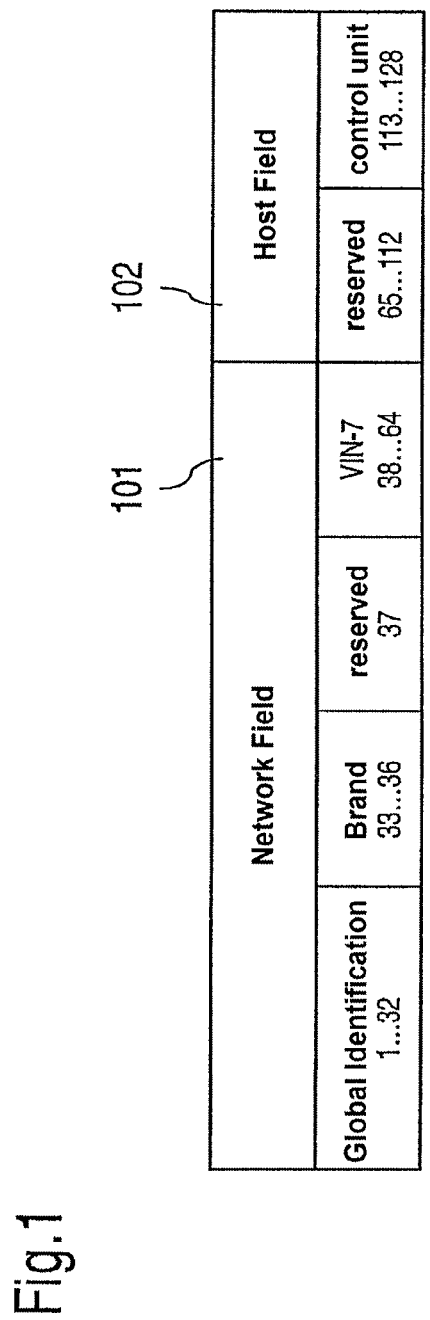
FIG. 1 shows, by way of example, one possible addressing architecture based on a prefix length of 128 bits, where the bits 1 to 64 identify a network field, and the bits 65 to 128 identify a host field.

FIG. 1 shows, by way of example, one embodiment of an addressing architecture based on a prefix length of 128 bits. The bits 1 to 64 identify a network field 101, and the bits 65 to 128 identify a host field 102.

The network field 101 is subdivided, for example, as follows.

(a) The bits 1 to 32 contain a global identification. For example, it is possible to request an identification for each production site of a vehicle manufacturer at a central place of issuance. As an alternative, it is also possible to request a single global identification for a vehicle manufacturer or a brand and to use it accordingly.

(b) The bits 33 to 36 identify, for example, the various brands (or vehicle models) of the vehicle manufacturer.

(c) The bit 37 is a reserved bit for addresses that will be needed in the future.

(d) The bits 38 to 64 are used for identifying the vehicle. For example, it may be an unambiguous identification for each vehicle (for example, a 7-place vehicle identification number, VIN 7) that comprises two alphanumeric and five numeric characters.

The host field 102 can be used as follows.

(a) The bits 65 to 112 can be reserved for additional applications or components.

(b) The bits 113 to 128 (16 bits=2 bytes) can be used for addressing control units in the vehicle. For example, identical control units can have the same identifications. Hence, it is possible to directly address similar control units in different vehicles (identifiable by means of the VIN 7 identification).

The identification of the control units inside the host field 102 can be done in any way and can also have a variable length (that is, a different number of bits) as a function of the requirements. Hence, it is possible to assign an unambiguous IP(v6) address to each control unit in a vehicle of a vehicle manufacturer and, in so doing, uniquely identify (or rather address) each (IP capable) control unit.

For example, following the replacement of a control unit (for example, in the case of a repair), a new control unit can be provided with the address of the old control unit. As a result, the replacement control unit can be addressed, like the previous control unit, both inside the vehicle and outside the vehicle (for example, over a mobile communication interface or over a (wireless or over a cable connected) service unit).

For example, it is possible that the address of the replaced (new) control unit is programmed and/or stored in the control unit before or after its installation in the vehicle. For this purpose, a central unit inside the vehicle can make known that portion of the address that the control unit is supposed to take over (network field comprising, in particular, the vehicle identification). Then the new control unit is assigned the address of the previous control unit (host field). This process can take place automatically or manually. For example, the vehicle can be provided with a router that provides messages at defined time intervals (for example, per multicast) (so-called "router advertisement messages"). With these messages it is possible to derive at least one portion of the address (for example, the information contained in the network field) for the new control unit.

The unique address of the control unit enables the customer or the vehicle manufacturer to directly address the control unit. This can be done, for example, inside the vehicle or also over a (mobile or hardwired) communication network, for example, from a backend of the vehicle manufacturer.

In this way information of the control unit (for example, a parameter, an incorrect storage, a functionality, etc.) can be queried. Preferably such an inquiry can be connected to an authentication of the querying instance and/or to an authorization. This strategy prevents unauthorized access to information of the control unit. Furthermore, it is possible to partially or totally encrypt the data between the control unit and the querying unit.

The backend of the vehicle manufacturer (or a service provider) includes, for example, at least one computer or more specifically at least one computer network, which can communicate at least intermittently with the vehicle over a mobile communication interface (for example, a mobile communication network, a WLAN, etc.). Furthermore, the backend can exhibit a connection to the Internet. As a result, it is possible, for example, for the central processing unit of the vehicle manufacturer to query information of control units by directly addressing these control units by way of the address described herein. This approach allows, for example, the IP capable components or control units of the vehicle to be accessed in an efficient and flexible way.

Figure 2:
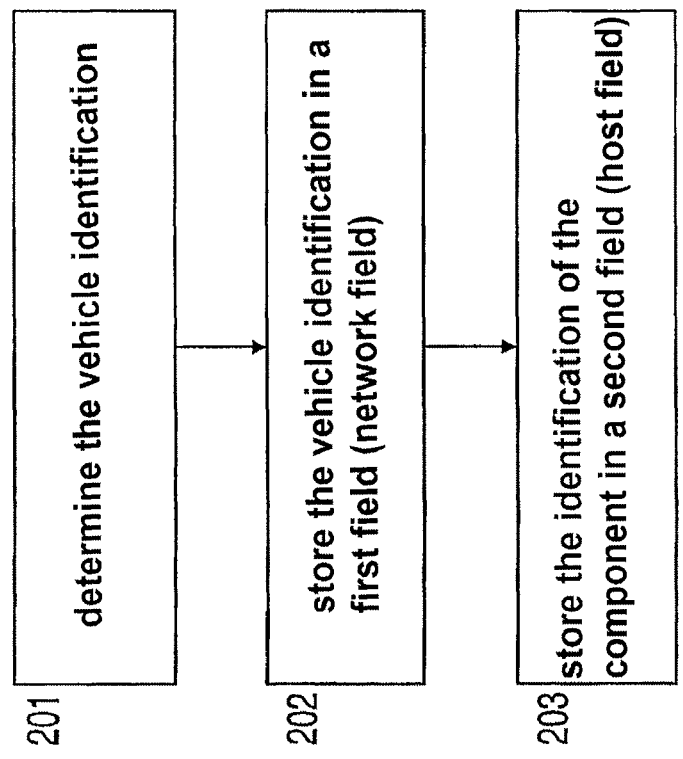
FIG. 2 is a schematic flowchart for determining an address of a component, in particular the IP address of a control unit.

FIG. 2 is a schematic flowchart for determining an address of a component, in particular the IP address of a control unit. In step 201, the vehicle identification is determined; it can be determined, for example, by way of an advertisement message provided by a router of the vehicle. In step 202, the vehicle identification is stored in a first field (for example, network field). Furthermore, in step 203, the identification of the component is stored in a second field (for example, host field). The identification of the component can be an identification number, model number, etc., which is available (stored) in the component. The identification of the component can also be assigned by a component of the vehicle or the network and communicated to the component. Furthermore, the identification of the component can also be assigned manually (for example, programmed).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining an address for each of a plurality of control units in a vehicle, the method comprising the acts of:
    determining, by a communication unit in the vehicle, a vehicle identification;
    storing, by a central processing unit, the vehicle identification in a first field of each of a plurality of Internet Protocol (IP) addresses, wherein each of the plurality of IP addresses are assigned to a corresponding one of the plurality of control units in the vehicle; and
    storing, by the central processing unit and for each of the plurality of control units, an identification in a second field of a corresponding one of the plurality of IP addresses,
    wherein the second field is separate from the first field,
    wherein the identification is such that, for each of the plurality of control units, a replacement control unit retains the identification,
    and wherein each of the plurality of control units is directly addressable from outside the vehicle using only the corresponding one of the plurality of IP addresses.

2. The method according to claim 1, further comprising the acts of:
    storing, by the central processing unit, additionally at least one of the following in the first field of each of the plurality of IP addresses:
        a global identification corresponding to at least one of the vehicle and a manufacturer of the vehicle;
        a brand of the manufacturer; and
        a vehicle model.

3. The method according to claim 2, wherein the vehicle identification is an unambiguous identification of the vehicle.

4. The method according to claim 2, wherein the first field is a network field of an IPv6 address, and the second field is a host field of the IPv6 address.

5. The method according to claim 2, further comprising the acts of:
    connecting each of the plurality of control units to a network of the vehicle; and
    storing the vehicle identification in each of the plurality of control units after being connected to the network of the vehicle.

6. The method according to claim 5, wherein the identification of the plurality of control units is associated with a corresponding model of each of such control units.

7. The method according to claim 1, wherein the vehicle identification is an unambiguous identification of the vehicle.

8. The method according to claim 7, wherein the first field is a network field of an IPv6 address, and the second field is a host field of the IPv6 address.

9. The method according to claim 1, wherein the first field is a network field of an IPv6 address, and the second field is a host field of the IPv6 address.

10. The method according to claim 1, further comprising the acts of:
    connecting each of the plurality of control units to a network of the vehicle; and
    storing the vehicle identification in each of the plurality of control units after being connected to the network of the vehicle.

11. The method according to claim 1, wherein the identification of the plurality of control units is associated with a corresponding model of each of such control units.

12. A computer program product, including: a non-transitory processor executable medium having processor executable code embodied therein for accessing a plurality of control units in a vehicle, the processor executable medium having:
    processor executable program code for obtaining an IP address of each of the control units in the vehicle; and
    processor executable program code for accessing each of the control units in the vehicle via a corresponding one of a plurality of IP addresses,
    wherein each of the plurality of IP addresses has a vehicle identification stored in a first field and a control unit identification stored in a second field,
    wherein the second field is separate from the first field,
    wherein the identification is such that, for each of the plurality of control units, a replacement control unit retains the identification, and
    wherein each of the plurality of control units is directly addressable from outside the vehicle using only the corresponding one of the plurality of IP addresses.

13. The computer program product according to claim 12, wherein the accessing act is carried out via a hardwired or wireless communication connection.

14. A vehicle, comprising:
    a plurality of control units, each having an IP address, wherein each of said IP addresses is created by:
        determining a vehicle identification,
        storing the vehicle identification in a first field of each IP address, and
        storing an identification for each of the plurality of control units in a second field of a corresponding IP address,
    wherein the second field is separate from the first field,
    wherein the identification is such that, for each of the plurality of control units, a replacement control unit retains the identification, and
    wherein the each of the plurality of control units is directly addressable from outside the vehicle using only the corresponding IP address.

* * * * *